Feb. 6, 1962 J. A. G. PAQUET 3,020,487

GAIN STABILIZED AMPLIFIER SYSTEM

Filed Nov. 19, 1958 3 Sheets-Sheet 1

Feb. 6, 1962 J. A. G. PAQUET 3,020,487

GAIN STABILIZED AMPLIFIER SYSTEM

Filed Nov. 19, 1958 3 Sheets-Sheet 2

United States Patent Office 3,020,487

Patented Feb. 6, 1962

3,020,487
GAIN STABILIZED AMPLIFIER SYSTEM

Jean Andre Gilbert Paquet, Paris, France, assignor to Lignes Telegraphiques & Telephoniques, Paris, France Filed Nov. 19, 1958, Ser. No. 775,067
Claims priority, application France Jan. 3, 1958
2 Claims. (Cl. 330—51)

The present invention relates to electron tube amplifiers for the transmission of signals, and more particularly to amplifiers of the type comprising two parallel amplifying paths with a common negative feedback circuit and in which each one of said paths is provided with a separate D.C. voltage supply. An object of the invention is to stabilize the value of the gain of such amplifiers even though one of their two supply voltages accidentally becomes zero or abnormally low.

Although the magnitude of gain variation of such amplifiers as might be caused by an abnormal decrease in one of their supply voltages is reduced considerably by the use of negative feeback, it cannot be expected to be completely negligible. In the case of a long-distance coaxial line, for example, comprising several wide frequency-band repeaters along its length, if all repeaters are simultaneously deprived of one of their D.C. voltage supplies, the gain variations of the various repeaters add themselves and their sum can reach a value much too high for a satisfactory operation of the system, even if the individual gain variation of any repeater remains rather small. The present invention seeks to obviate this drawback and this improvement is effected by automatically inserting one or several compensating impedances in the output circuit of the amplifier when the voltage of one of the D.C. supply sources falls below a predetermined value.

According to the present invention, there is provided a wide-band electron tube amplifier including first and second amplifying paths having a common input circuit and a common output circuit and in which each one of said amplifying paths has its electron tubes supplied with power from one of two different D.C. voltage sources, comprising at least one impedance, two terminals in said output circuit, means for connecting one terminal of each said impedance or impedances to one of said two output circuit terminals, and switching means connected between the other terminal of said impedance or impedances to the other of said output circuit terminals and automatically connecting or disconnecting all or part of said impedances when the voltage of one of said D.C. voltage sources falls below a predetermined value.

In one embodiment of the invention, said impedances consist of a pair of two-terminal networks, the first of which is connected across the output circuit common to both said amplifying paths when both said D.C. sources have their normal voltage values, the second of said networks being then disconnected. If one of the supply voltages becomes zero or abnormally low, the two networks are automatically interchanged by the operation of said switching means.

In a preferred embodiment of the invention, said impedance networks are connected to or disconnected from two terminals provided in said output circuit, one of said terminals being itself connected to the anodes of the tubes of the output stages of both said amplifying paths, and the other of said terminals being connected to a point at a fixed potential of the amplifier, hereinunder referred to as ground.

Also in a preferred embodiment of the invention, automatic interchange of the two networks is achieved by means of two relay elements, each one of which consists of a semi-conductor diode: a first diode is series-connected with the first of said impedance networks in such a way that it be conducting in the direction from the anodes to ground, and a second diode is so arranged in series with the second impedance network as to be conducting in the reverse direction. Each diode is submitted to a biassing voltage which is the difference between a voltage $V_0$ kept at a constant value, whatever the values of the D.C. supply voltages may be, (by means of a Zener diode, for example) and applied to one electrode of the diode located on its grounded side, and a voltage $V_c$ which is a function of the two supply voltages and is applied to its other electrode. Voltages $V_c$ and $V_0$ are so chosen that their difference is positive for the normal condition of the two supply voltages, but becomes negative when one of the latter voltages becomes zero or abnormally low. Owing to the corresponding biassing voltage variation, the previously conducting first diode becomes non-conducting, while the second diode, previously non-conducting, becomes conducting. Interchange of the two impedance networks is thus obtained.

If the gain variations to be compensated are positive in the whole band of the transmitted signal frequencies, said first network may have an infinite impedance in the whole of this band; it can therefore be omitted as well as the diode with which it is associated.

If, on the contrary, the gain variations are negative in the whole band of transmitted frequencies, said second network may have an infinite impedance in the whole of this band; it can therefore be omitted as well as the diode with which it is associated.

In the case of large variations of the two supply voltages about their normal value, without anyone of them becoming abnormally low, non-linear distortion of the signals to be amplified could also be expected. To obviate this drawback, according to the invention, such a value is given to voltage $V_c$ that the diode is non-conducting, whatever value said supply voltage variations may assume, and that $V_c$ automatically take a zero value under the action of an electromagnetic relay or of any other suitable device if one of the two supply voltages becomes zero or abnormally low.

The invention will now be explained in greater detail with the aid of non-limitative examples which are illustrated in the annexed drawings, in which.

Figure 1:
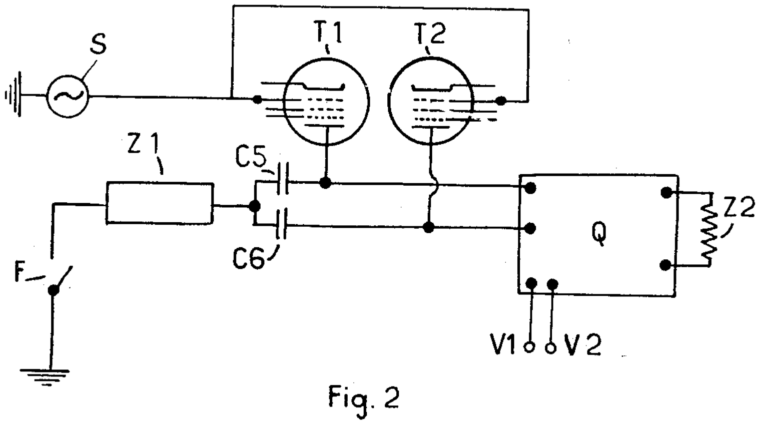
FIG. 1 is a simplified diagram illustrating the principle of the invention.

The invention will first be described for the case where the gain variation which occurs when one of the two amplifier supply voltages becomes zero or abnormally low remains positive in the whole band of the signal frequencies, for example in amplifiers the feedback rate of which strongly decreases with increasing frequency. The principle of the invention is shown in FIG. 1 where $T_1$ and $T_2$ are the output tubes of the two amplifying paths, these tubes being assumed, by way of example, to be pentodes. The voltages delivered to the anodes of these tubes are respectively the voltages $V_1$ and $V_2$ of the two supply systems. Signal voltages from a common input circuit including a signal source S are applied to the control grids of both said tubes. For greater simplicity of the drawing, some of the necessary elements for the connection of the supply systems with the other electrodes of the above-mentioned output tubes or for their connection with the amplifier input or with other tubes are not shown. The amplified signals issuing from tubes $T_1$ and $T_2$ are applied to the input of a four-terminal network Q which may be a linking member either with a transmission line or with another amplifier if several amplifiers in tandem connection are provided. From the viewpoint of communication signals, the two illustrated terminals of Q, connected to the anodes of tubes $T_1$ and $T_2$, can be considered as a single input terminal and the two terminals connected to the supply devices can also be considered as a single second input terminal of Q. When one of the D.C. voltages $V_1$ or $V_2$ becomes zero or abnormally low, the resulting gain variation, assumed to be positive, is automatically balanced by a supplementary attenuation produced by the insertion of an impedance $Z_1$ between the anodes of tubes $T_1$ and $T_2$ and ground, Z, being the value of said impedance for the frequencies of the alternating signal currents, this being effected by means of a device represented in a simplified manner by a switch F. Condensers $C_5$ and $C_6$ are connected between the anodes of tubes $T_1$ and $T_2$, respectively, and one of the terminals of impedance $Z_1$.

Assuming that the gain variations which are to be compensated to be small, for example one decibel, a simple calculation shows how a value of the impedance $Z_1$ can be determined which, in this case, must be large with respect to the input impedance $Z_3$ of the network Q, terminated on an impedance $Z_2$. By inserting the impedance $Z_1$ between the anodes of tubes $T_1$ and $T_2$ and ground, an attenuation is produced in the transmission line which is equal to the real part of the ratio of impedances $Z_3$ and $Z_1$ and which must balance the gain variation experimentally determined in the transmitted frequency band. The real part of the ratio of $Z_3$ to $Z_1$ is therefore known; it is possible to obtain this ratio therefrom and, $Z_3$ being known, to calculate the value of the equalizing impedance $Z_1$ as a function of frequency.

Figure 2:
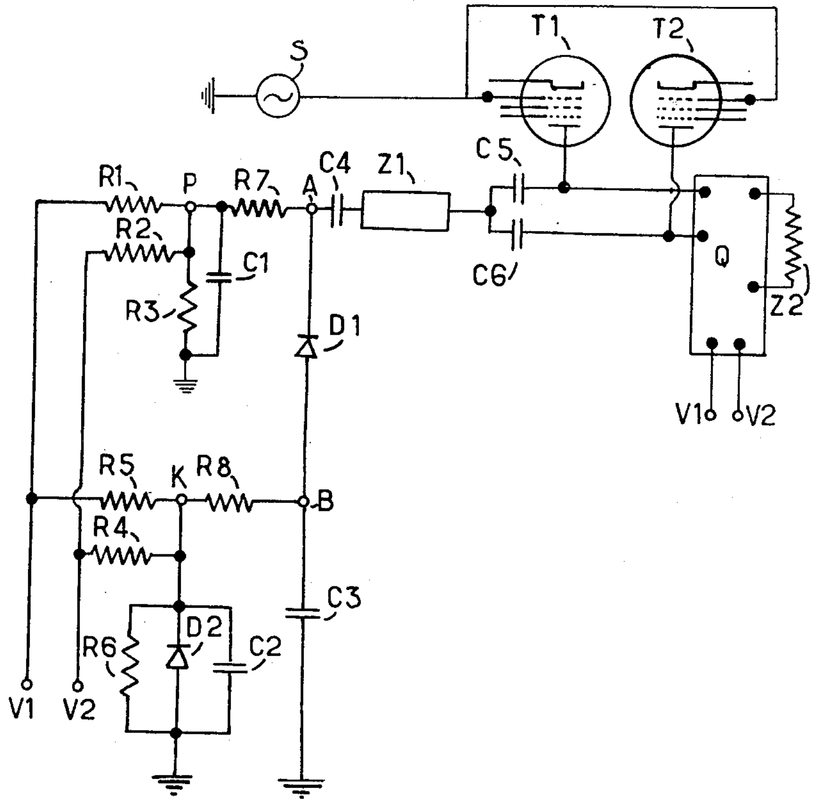
FIG. 2 shows an example of a device for the automatic connection of an impedance network according to the invention, using diode switching means.

According to the invention, the equalizing impedance network $Z_1$ is automatically switched-in by means of a switching element constituted by a diode, for example a germanium diode. FIG. 2 is diagram of a device including such a diode and controlling the switching-in of the impedance $Z_1$. In FIG. 2 are shown two terminals to which are applied the supply voltages $V_1$ and $V_2$ respectively supplying the anodes of tubes $T_1$ and $T_2$ respectively belonging to each one of the two amplifying paths.

An equalizing impedance $Z_1$ and a diode or connecting element $D_1$ are series-connected between the anodes of tubes $T_1$ and $T_2$ and ground, i.e. in parallel connection with the input of the network Q, from the viewpoint of the signals to be transmitted. The impedance of diode $D_1$ is, according to its D.C. voltage biassing, either a very high or a very low one. When it passes from its first state, i.e. the non-conducting one, to the second state, i.e. its conducting one, the impedance $Z_1$ is inserted between the anodes of tubes $T_1$ and $T_2$ and ground.

The switching action of diode $D_1$ results from the well-known fact that its resistance suddenly drops from a very high to a very low value (or conversely) when the bias voltage applied thereto changes from a positive to a negative or zero value.

In order to cause the passing of the diode from one state to the other, the biassing D.C. voltage applied to its terminals should undergo a polarity reversal when one of the voltages $V_1$ or $V_2$ becomes zero or abnormally low.

To this end, point B, connected to ground by condenser $C_3$, is at ground potential for the alternating signal voltages to be amplified; it is raised to a constant D.C. potential $V_0$ with respect to ground, derived from the voltages $V_1$ and $V_2$ by means of resistances $R_4$, $R_5$, $R_6$ and a Zener diode $D_2$ connected at the common point K to resistances $R_4$, $R_5$ and $R_6$. Due to the operation of the Zener diode $D_2$, the potential of point B retains a constant value $V_0$, even if one of the voltages $V_1$ and $V_2$ become zero. The assembly of resistance $R_8$ and condenser $C_2$ constitutes a by-pass circuit for the signal frequencies.

The control potential $V_c$ at point A may be considered equal to potential $V_p$ at point P. As a matter of fact, in the case where diode $D_1$ is in its non-conducting condition, the potential at point A is slightly higher than that at point P, but the value of resistance $R_7$ can be selected at a low enough value to give the difference between the latter potentials a negligible value.

In the case where voltages $V_1$ and $V_2$ have normal values, the potential at point P, referred to ground, is determined by the values of resistance $R_1$, $R_2$ and $R_3$, the assembly of which constitutes a voltage differential circuit.

Designating by $I_1$ and $I_2$, the intensities of the currents toward point P in resistances $R_1$ and $R_2$, respectively, the following relations between $I_1$, $I_2$, $V_1$ and $V_2$ can be noted:

$$V_1=R_1I_1+R_3(I_1+I_2)$$

$$V_2+R_2I_2+R_3(I_1+I_2)$$

whence:

$$I_1=\frac{(R_2+R_3)V_1-R_3V_2}{R_1R_2+R_3(R_1+R_2)}$$

$$I_2=\frac{-R_3V_1+(R_1+R_3)V_2}{R_1R_2+R_3(R_1+R_2)}$$

from which follows:

$$V_p=R_3(I_1+I_2)=\frac{R_3(R_2V_1+R_1V_2)}{R_1R_2+R_3(R_1+R_2)}$$

Assuming both voltages $V_1$ and $V_2$ to have their common nominal value V, it results from the latter equation that $$V_p=\frac{R_3(R_1+R_2)V}{R_1R_2+R_3(R_1+R_2)}$$

Thus, in the case where resistances $R_1$ and $R_2$ have equal values, the value of the control potential $V_c$ equals:

$$V_{c_1}=\frac{R_3}{R_3+R_1/2}\cdot V \qquad (1)$$

In the case where one or the other of voltages $V_1$ and $V_2$ has a zero value, while one of them has its nominal value V, the potential at P, referred to ground potential, and, consequently, the control potential $V_c$ have the value:

$$V_{c_2}=\frac{R_3}{2R_3+R_1}\cdot V \qquad (2)$$

The values of the various elements in the circuit are such that the fixed potential $V_0$ at B is lower than $V_{c_1}$ and higher than $V_{c_2}$, as respectively defined in Equations 1 and 2. If $V_1$ or $V_2$ is abnormally low (one of them having its normal value), the value of $V_c$ is slightly higher than $V_{c_2}$, but still lower than $V_0$.

For instance, for a common nominal value $V_c$ of 180 volts, the voltage stabilized by the Zener diode can be 80 volts; if the ratio $R_1/R_3$ is given the value 1.6, voltage $V_{c_1}$ is equal to 100 volts and $V_{c_2}$ to 50 volts. The control difference voltage $(V_c-V_0)$ for diode $D_1$ is thus a positive one when both supply voltages $V_1$ and $V_2$ are approximately equal to their nominal value, while it becomes negative when one of the latter voltages is zero or very low, the other keeping its nominal value; it results therefrom that diode $D_1$, which was non-conducting in the first case, becomes conducting in the second one and inserts the impedance $Z_1$ between the anodes of the amplifier output tubes and ground.

Resistance $R_7$ avoids propagation of the signal currents from the amplifier toward the D.C. voltage source and constitutes, together with condenser $C_1$, a by-pass network for the high frequencies of these currents. Condenser $C_4$ has a high value capacity and protects the diode $D_1$ from the D.C. voltages existing at the anodes of tubes $T_1$ and $T_2$. Diode $D_1$, having a very high impedance when the amplifier operates normally, its presence and that of impedance $Z_1$ do not cause any noticeable signal distortion, at least if the signal amplitudes remain sufficiently low.

However, if voltages $V_1$ and $V_2$ fluctuate around their normal value, voltage $V_c$ may become approximately equal to $V_0$. The control voltage $(V_c-V_0)$ of diode $D_1$ then vanishes and the assembly constituted by impedance $Z_1$ and diode $D_1$ in series presents an ill-defined and non-linear impedance. Non-linear distortion of the signals received at the output of the amplifier can result therefrom. Such distortion may become serious if the variations of voltages $V_1$ and $V_2$ are important, for example if they reach twenty percent of the normal value of the latter voltages. This drawback can be avoided by using a variant of the device of FIG. 2 as shown in FIG. 3.

Figure 3:
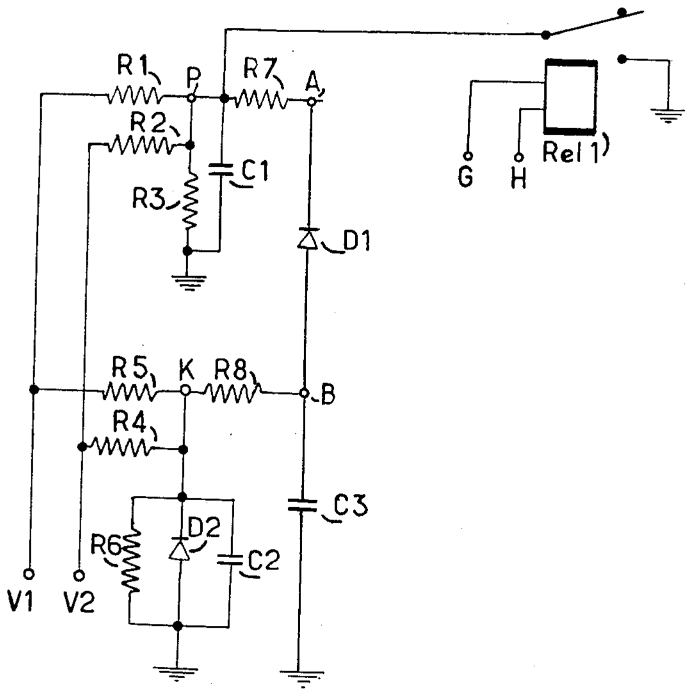
FIG. 3 represents a variant of the device of FIG. 2, including an electromagnetic relay for grounding one of the diode electrodes when one of the supply voltages becomes zero or abnormally low.

In FIG. 3, point P has such a potential $V_c$ that, during the normal operation of the amplifier, diode $D_1$ remains non-conducting even if the variations of voltages $V_1$ and $V_2$ about their normal value are comparatively large; point P is automatically grounded if one of the two latter voltages becomes zero or abnormally low.

As an example, in the device represented on FIG. 3, when one of the voltages $V_1$ and $V_2$ becomes zero or abnormally low, point P is automatically grounded by means of an electromagnetic relay $Rel_1$. Potential $V_c$ is then zero with respect to ground and diode $D_1$ is made conducting by the D.C. voltage $V_0$. Generally speaking, the operation of the device is the same as that of the device of FIG. 2.

Figure 4:
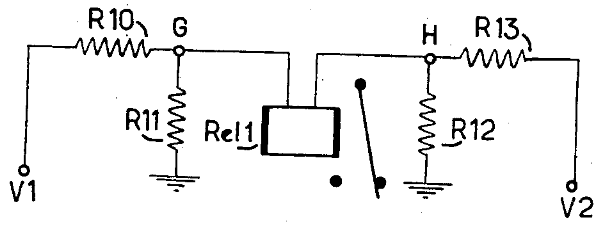
FIG. 4 is a diagram of a control circuit for the electromagnetic relay of FIG. 3.

The electromagnet relay $Rel_1$ may be operated by an unbalancing between voltages $V_1$ and $V_2$, by means of a device such as that shown in FIG. 4. Point G is raised to a potential proportional to $V_1$ with respect to ground, by resistances $R_{10}$ and $R_{11}$; point H is raised to a potential proportional to $V_2$ by resistances $R_{12}$ and $R_{13}$. A winding of relay $Rel_1$ connects points G and H. If both voltages $V_1$ and $V_2$ remain approximately normal, points G and H remain at potentials near to each other. If voltage $V_1$ becomes zero, point G is grounded by resistance $R_{11}$ and a current flows through relay $Rel_1$ and resistance $R_{13}$. The relay closes its contacts and point P is grounded. Relay $Rel_1$ must not be polarized, in order to be able to operate whatever the polarity of the unbalancing of voltages $V_1$ and $V_2$ may be.

Point P may be grounded by means of any other suitable device, the electromagnetic relay being only given as an example; it could be replaced, for example, by an electronic trigger system having two stable conditions.

The invention has been described for the case of positive gain variations of an amplifier. If these variations are negative for all frequencies of the signal band, which is the case for example for an amplifier the negative feedback rate of which increases with increasing frequency, stabilization of the gain variations could be obtained with the aid of devices similar to those described, but in which the biassing of diode $D_1$ should be reversed. Impedance $Z_1$ would then be connected during the normal operation and disconnected if one of the voltages $V_1$ or $V_2$ became zero or abnormally low.

Figure 5:
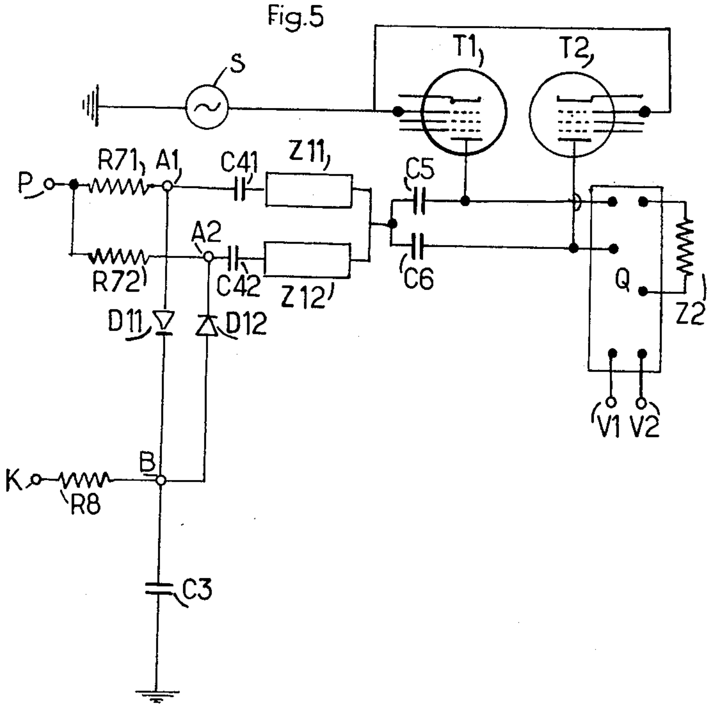
FIG. 5 shows an example of a device according to the invention, in the case where the gain variation to be compensated is either positive or negative according to the considered frequency in the transmitted signal frequency band.

For the case of a positive gain variation in certain parts of the considered frequency band and of a negative one in others, stabilization of the gain variations can be obtained as shown in FIG. 5, by combining the two above-mentioned devices. When the algebraic sign of voltage $(V_c-V_0)$ changes, the impedances $Z_{11}$ and $Z_{12}$ respectively in series with diodes $D_{11}$ and $D_{12}$ are interchanged.

If the amplifier gain has the value $G_1$ when voltage $(V_c-V_0)$ is positive and if, consequently, the impedance $Z_{11}$ is connected, and if the amplifier gain has the value $G_2$ when voltage $(V_c-V_0)$ is negative and, if consequently, the impedance $Z_{12}$ is connected, the gain variation produced by the change in the sign of voltage $(V_c-V_0)$ and the corresponding interchange of the impedances $Z_{11}$ and $Z_{12}$ is $(G_1-G_2)$, which may have any sign in the band of the transmitted frequencies, provided the electrical characteristics of $Z_{11}$ and $Z_{12}$ are suitably selected.

What is claimed is:

1. A gain stabilized amplifier system comprising parallel amplifiers including common input and output circuits, said output circuits having a determinable reference point, separate D.C. voltage sources coupled to and simultaneously supplying power to said individual amplifiers, voltage differential circuit means coupled to and responsive to the difference in voltage of said sources, an impedance, and connection means coupled to said output circuits and coupling said impedance to said reference point, in response to a first condition of said voltage difference, said connection means also being adapted for selectively and effectively isolating said output circuits and said impedance in response to a second condition of said voltage difference, said connection means being coupled to and controlled by said voltage differential circuit means and responsive to said two conditions of said difference in voltage.

2. An amplifier system as claimed in claim 1 wherein said connection means comprises a diode coupled to said impedance and said voltage differential circuit means biasing said diode to conducting and non-conducting states according to the voltages of said sources.

References Cited in the file of this patent

UNITED STATES PATENTS

| | | |
|---|---|---|
| 2,597,043 | Treadwell | May 20, 1952 |

FOREIGN PATENTS

| | | |
|---|---|---|
| 635,132 | Great Britain | Apr. 5, 1950 |
| 833,515 | Germany | Mar. 10, 1952 |